(12) United States Patent
Gulevich et al.

(10) Patent No.: US 7,674,741 B2
(45) Date of Patent: Mar. 9, 2010

(54) COMPONENTS AND CATALYSTS FOR THE POLYMERIZATION OF OLEFINS

(75) Inventors: Yuri Gulevich, Ferrara (IT); Giulio Balbontin, Savona (IT); Remco Kelder, Hoevelaken (NL); Giampiero Morini, Padova (IT); Jan Dirk Van Loon, Koenigstein (DE)

(73) Assignee: Basell Poliolefine Italia s.r.l., Milan (IT)

( * ) Notice: Subject to any disclaimer, the term of this patent is extended or adjusted under 35 U.S.C. 154(b) by 512 days.

(21) Appl. No.: 11/629,240

(22) PCT Filed: May 27, 2005

(86) PCT No.: PCT/EP2005/005821

§ 371 (c)(1),
(2), (4) Date: Dec. 11, 2006

(87) PCT Pub. No.: WO2005/123784

PCT Pub. Date: Dec. 29, 2005

(65) Prior Publication Data

US 2009/0118446 A1    May 7, 2009

Related U.S. Application Data

(60) Provisional application No. 60/580,268, filed on Jun. 16, 2004.

(30) Foreign Application Priority Data

Jun. 16, 2004  (EP) .................................. 04102755

(51) Int. Cl.
 *C08F 4/64*  (2006.01)
 *C08F 10/00*  (2006.01)

(52) U.S. Cl. ...................... 502/150; 502/104; 502/127; 502/124; 502/122

(58) Field of Classification Search .................. 502/150
See application file for complete search history.

(56) References Cited

U.S. PATENT DOCUMENTS

| 444,967 | A | * | 1/1891 | Arzoumanidis et al. ..... 126/546 |
|---|---|---|---|---|
| 4,220,554 | A | | 9/1980 | Scata et al. |
| 4,298,718 | A | | 11/1981 | Mayr et al. |
| 4,399,054 | A | | 8/1983 | Ferraris et al. |
| 4,444,967 | A | | 4/1984 | Arzoumanidis et al. |
| 4,469,648 | A | | 9/1984 | Ferraris |
| 4,495,338 | A | | 1/1985 | Mayr et al. |
| 4,904,628 | A | * | 2/1990 | Albizzati et al. ............. 502/121 |
| 5,041,403 | A | * | 8/1991 | Nakajo et al. ................ 502/104 |
| 6,344,530 | B2 | * | 2/2002 | Sugano et al. ............... 526/160 |
| 2002/0045537 | A1 | * | 4/2002 | Yang et al. .................. 502/158 |

FOREIGN PATENT DOCUMENTS

| EP | 86473 | 8/1983 |
|---|---|---|
| EP | 383346 | 8/1990 |
| EP | 395083 | 10/1990 |
| EP | 553805 | 8/1993 |
| EP | 553806 | 8/1993 |
| EP | 601525 | 6/1994 |
| WO | 98/44001 | 10/1998 |

\* cited by examiner

*Primary Examiner*—Jerry Lorengo
*Assistant Examiner*—Yun Qian
(74) *Attorney, Agent, or Firm*—Jarrod N. Raphael

(57) ABSTRACT

The present invention relates to a solid catalyst component for the polymerization of olefins $CH_2$=CHR in which R is hydrogen or a hydrocarbon radical with 1-12 carbon atoms, comprising Mg, Ti, halogen and an electron donor selected from γ-butyrolactone derivatives of a particular formula. Said catalyst components, when used in the polymerization of olefins and in particular of propylene, are capable to give polymers in high yields and with high isotactic index expressed in terms of high xylene insolubility.

11 Claims, No Drawings

COMPONENTS AND CATALYSTS FOR THE POLYMERIZATION OF OLEFINS

The present invention relates to catalyst components for the polymerization of olefins, to the catalyst obtained therefrom and to the use of said catalysts in the polymerization of olefins. In particular the present invention relates to catalyst components, suitable for the stereospecific polymerization of olefins, comprising Ti, Mg, halogen and an electron donor compound selected from specific γ-butyrolactone derivatives. Said catalyst components, when used in the polymerization of olefins and in particular of propylene, are capable to give polymers in high yields and with high isotactic index expressed in terms of high xylene insolubility.

The use of some γ-butyrolactones derivatives as electron donor compounds for the preparation of olefin polymerization catalysts is known in the art. EP 86473 discloses the use of α-methyl-α-phenyl-γ-butyrolactone (Ex. 11) as internal donor in the preparation of a catalyst component. Both the stereoregularity of the polypropylene obtained and the activity of the catalyst are however unsatisfactory.

In EP 383 346 is disclosed the use of alkoxyesters of general formula $(R^1O)_i(R^2O)_j(R^3O)_k$—Z—$COOR^4$ in which $R^1$ to $R^4$ are hydrocarbon groups, and Z is divalent radical and i, j, and k are integers from 0 to 3 with their sum being at least 1. Said patent application does not mention lactones or alkoxylactone derivatives.

It has been therefore very surprising to discover that the use of certain alkoxy-substituted γ-butyrolactones, gives catalyst components having an increased activity and stereospecificity with respect to the catalyst components containing the known lactones of the prior art.

It is therefore an object of the present invention to provide a solid catalyst component for the polymerization of olefins $CH_2=CHR$ in which R is hydrogen or a hydrocarbon radical with 1-12 carbon atoms, comprising Mg, Ti, halogen and an electron donor selected from γ-butyrolactone derivatives of formula (I)

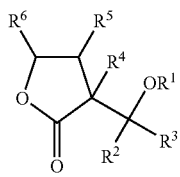

wherein the groups $R^2$-$R^6$ are, same or different, hydrogen or a C1-C20 hydrocarbon group optionally containing heteroatoms, $R^1$ is a C1-C20 hydrocarbon group optionally containing heteroatoms, and two or more of the groups $R^2$-$R^6$ can be linked to form a cycle.

The groups $R^5$-$R^6$ are preferably selected from hydrogen or C3-C10 hydrocarbon groups, preferably among alkyls, cycloalkyls, aryls and arylalkyl groups. The use of hydrogen or C3-C10 alkyls is especially preferred. The group $R^4$ is preferably chosen among C3-C10 hydrocarbon groups, in particular among primary or secondary alkyls. Particularly preferred are the linear primary alkyls and the cycloalkyl-alkyl groups.

The groups $R^2$-$R^3$ are preferably hydrogen.

The group $R^1$ is preferably selected among primary C1-C10 alkyl groups. Particularly preferred groups are methyl, ethyl, isobutyl, isopentyl, neopentyl, 2-methyl-butyl, 2-ethyl-butyl and 2-ethyl-hexyl.

Specific examples of useful alkoxy substituted γ-butyrolactone derivatives are α-methyl-α-methoxymethyl-γ-butyrolactone, α-hexyl-α-methoxymethyl-γ-butyrolactone, α-cyclohexylmethyl-α-methoxymethyl-γ-butyrolactone, α-cyclohexylmethyl-α-ethoxymethyl-γ-butyrolactone, α-cyclohexylmethyl-γ-cyclohexyl-α-methoxymethyl-γ-butyrolactone, α-benzyl-α-methoxymethyl)-γ-butyrolactone, α-isopropyl-α-methoxymethyl-γ-butyrolactone, α-cyclohexyl-α-methoxymethyl-γ-butyrolactone, α-phenyl-α-methoxymethyl-γ-butyrolactone.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. The magnesium halide is preferably $MgCl_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra, in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst components of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The preparation of the solid catalyst component can be carried out according to several methods.

According to one of these methods, the magnesium dichloride in an anhydrous state and the γ-butyrolactone derivative are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappear. According to a further method, the product obtained by co-milling the magnesium chloride in an anhydrous state, the titanium compound and the γ-butyrolactone derivative is treated with halogenated hydrocarbons such as 1,2-dichloroethane, chlorobenzene, dichloromethane, etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated at a temperature of about 80 to 135° C. with an excess of $TiCl_4$ which contains, in solution, a γ-butyrolactone derivative. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of TiCl$_4$ comprising the γ-butyrolactone derivative in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0, 5-2 hours. The treatment with TiCl$_4$ can be carried out one or more times. The γ-butyrolactone derivative can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the γ-butyrolactone derivative is added during one or more of these treatments.

In any of these preparation methods the desired γ-butyrolactone derivative can be added as such or, in an alternative way, it can be obtained in situ by using an appropriate precursor capable to be transformed in the desired electron donor compound by means, for example, of known chemical reactions such as etherification, internal esterification. Generally, the γ-butyrolactone derivative is used for the preparation of the catalyst component in molar ratio with respect to the MgCl$_2$ of from 0.01 to 1 preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbonyl radical with 1-12 carbon atoms, comprising the product of the reaction between:

(a) a solid catalyst component comprising a Mg, Ti and halogen and an electron donor selected from γ-butyrolactone derivatives of formula (I)

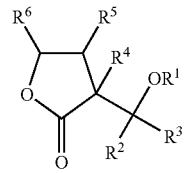

wherein the groups R$^2$-R$^6$ are, same or different, hydrogen or a C1-C20 hydrocarbon group optionally containing heteroatoms, R$^1$ is a C1-C20 hydrocarbon group optionally containing heteroatoms, and two or more of the groups R$^2$-R$^6$ can be linked to form a cycle;

(b) an alkylaluminum compound and, optionally, (c) one or more electron-donor compounds (external donor).

The alkyl-Al compound (b) is preferably selected from the trialkylaluminum compounds such as, for example, triethylaluminum, triisobutylaluminum, tri-n-butylaluminum, tri-n-hexylaluminum and tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donor (c) can be of the same type or it can be different from the 7-butyrolactone derivative. Suitable external electron-donor compounds include silicon compounds, ethers, esters such as ethyl 4-ethoxybenzoate, amines, heterocyclic compounds and particularly 2,2,6,6-tetramethyl-piperidine, ketones and the 1,3-diethers of the general formula (II):

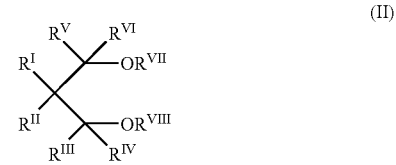

wherein R$^I$, R$^{II}$, R$^{III}$, R$^{IV}$, R$^V$ and R$^{VI}$ equal or different to each other, are hydrogen or hydrocarbon radicals having from 1 to 18 carbon atoms, and R$^{VII}$ and R$^{VIII}$, equal or different from each other, have the same meaning of R$^I$-R$^{VI}$, except that they cannot be hydrogen; one or more of the R$^I$-R$^{VIII}$ groups can be linked to form a cycle. Particularly preferred are the 1,3-diethers in which R$^{VII}$ and R$^{VIII}$ are selected from C$_1$-C$_4$ alkyl radicals.

Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3-10 carbon atoms optionally containing heteroatoms and $R^7$ is a $C_1$-$C_{10}$ alkyl group, in particular methyl. Examples of such preferred silicon compounds are methylcyclohexyldimethoxysilane, diphenyldimethoxysilane, methyl-tert-butyldimethoxysilane, dicyclopentyldimethoxysilane, 2-ethylpiperidinyl-2-tert-butyldimethoxysilane and 1,1,1-trifluoropropyl-2-ethylpiperidinyldimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, tert-butyltrimethoxysilane and thexyltrimethoxysilane.

The electron donor compound (c) is used in an amount suitable to give a molar ratio between the organoaluminum compound and said electron donor compound (c) of from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples reported hereinbelow, the use as internal electron donors of the lactones of the prior art gives worse results in term of yields and/or xylene insolubility.

Therefore, it constitutes a further object of the present invention a process for the (co)polymerization of olefins, carried out in the presence of a catalyst comprising the product of the reaction between:

(a) a solid catalyst component as defined above;

(b) an alkylaluminum compound and, optionally, (c) one or more electron-donor compounds (external donor).

Preferred olefins to be (co)polymerized are the alpha olefins having from 2 to 12 carbon atoms. In particular, ethylene, propylene, butene-1, hexene-1 and octene-1. Among them ethylene, propylene, butene-1 and mixture thereof are especially preferred. The polymerization process can be carried out according to known techniques such as, for example, slurry polymerization using as diluent an inert hydrocarbon solvent or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

CHARACTERIZATIONS

Preparation of γ-butyrolactone Derivatives

γ-Butyrolactone derivatives can be prepared according to the following illustrative procedures:

2-(Cyclohexyl-methyl)-2-methoxymethyl)-γ-butyrolactone

2-Benzyl-butyrolactone

A solution of diisopropylamine (63.0 mL) in THF was treated dropwise with butyl lithium (268 mL of 1.6M solution in hexanes) at −10° C. Upon completion of the addition, the reaction mixture was cooled to −70° C. and then treated dropwise with γ-butyrolactone (33.0 mL) keeping the speed of the addition at such a rate that the temperature of the mixture remained below −60° C. After stirring for additional 30 min at −70° C., the mixture was treated dropwise with benzyl bromide (51.0 mL) again keeping the speed of the addition at such a rate that the temperature of the mixture remained below −60° C. After completion of the addition, the stirring of the reaction mixture was continued at −70° C. for 2 h. Then the mixture was warmed-up to 0° C. and quenched by addition of a small amount of water. The solvents were removed in vacuum and the residue was redissolved in dichloromethane, washed with 10% aqueous hydrochloric acid, then with water, dried over magnesium sulfate, filtered, concentrated on a rotary evaporator and distilled in vacuum to give 26.0 g (34%) of the title compound.

2-(Cyclohexyl-methyl-γ-butyrolactone

In a 250 mL autoclave a mixture of 2-benzyl-γ-butyrolactone (5.00 g) and Rh-catalyst (5 wt. % Rh on carbon, 0.500 g) in isopropanol (60 mL) was treated with hydrogen (13 bar) at 120° C. for 18 h. Upon completion of the hydrogenation, the mixture was filtered and concentrated on a rotary evaporator to give 4.75 g (92%) of the title compound.

2-(Cyclohexyl-methyl)-2-methoxymethyl)-γ-butyrolactone

A solution of diisopropylamine (19.0 mL) in THF was treated dropwise with butyl lithium (82.5 mL of 1.6M solution in hexanes) at −10° C. Next the reaction mixture was cooled to −78° C. and treated dropwise with 2-(cyclohexyl-methyl)-γ-butyrolactone (18.0 mL) keeping the speed of the addition at such a rate that the temperature of the mixture remained below −60° C. After completion of the addition, the mixture was stirred for 4.5 h at −78° C., then warmed-up to −40° C. and treated dropwise at this temperature with chloromethyl methyl ether (10.8 mL). After that, the mixture was allowed to slowly warm-up to room temperature and stirred at this temperature for 60 h. The solvents were removed in vacuum and the residue was redissolved in dichloromethane, then washed with a saturated aqueous solution of ammonium chloride, dried over magnesium sulfate, filtered, concentrated on a rotary evaporator and finally distilled in vacuum to give 5.90 g (25%) of the title compound.

2-(Cyclohexyl-methyl)-2-ethoxymethyl-γ-butyrolactone

2-(Cyclohexyl-methylene)-γ-butyrolactone

A solution of 2-acetyl-γ-butyrolactone (15.4 g) in toluene (100 mL) was treated portionwise with sodium hydroxide (4.8 g) during 10 min and then refluxed with a Dean & Stark moisture receiver until the formation of water had stopped (about 1 h). After that the reaction mixture was treated dropwise with cyclohexanecarbaldehyde (15.0 g) during 1 h. Upon completion of the addition, the mixture was refluxed for 4 h, then cooled to room temperature and washed with water. After drying over magnesium sulfate, the obtained organic phase was filtered, concentrated on a rotary evaporator and distilled in vacuum to give 4.54 g (21%) of the title compound.

2-(Cyclohexyl-methyl)-γ-butyrolactone 2-(Cyclohexyl-methylene)-γ-butyrolactone (8.90 g) was added fast to a mixture of nickel(II) chloride (1.76 g) and methanol (30 mL) at room temperature. The obtained reaction mixture was cooled to 0° C., stirred at this temperature for 30 min and then treated portionwise with sodium borohydride (5.60 g). Upon completion of the addition, the mixture was stirred for 1 h at room temperature and then quenched by pouring onto a mixture of ice and 10% aqueous hydrochloric acid. The formed organic phase was separated and the aqueous phase was extracted with ether. The combined organic phases were dried over magnesium sulfate, filtered and concentrated on a rotary evaporator to give 6.96 g (77%) of the title compound.

2-(Cyclohexyl-methyl)-2-ethoxymethyl-γ-butyrolactone

A solution of lithium diisopropylamide prepared from diisopropylamine (6.50 mL) and butyllithium (29.0 mL of 1.6M solution in hexanes) in THF (105 mL) was treated dropwise with 2-(cyclohexyl-methyl)-γ-butyrolactone (6.96 g) at −78° C. The reaction mixture was stirred at the same temperature for additional 30 min and then treated dropwise with chloromethyl ethyl ether (5.05 g). Upon completion of the addition, the mixture was allowed to slowly warm-up to room temperature and stirred at this temperature overnight. After that, the mixture was quenched by pouring onto a mixture of ice and 10% aqueous phosphoric acid. The formed organic phase was separated and the aqueous phase was extracted with toluene. The combined organic phases were washed with water, dried over potassium sulfate, filtered, concentrated on a rotary evaporator and purified by column chromatography (silica gel, eluent-hexane) to give 5.90 g (64%) of the title compound.

2-Isopropyl-2-methoxymethyl)-γ-butyrolactone

2-(O,O-Diethyl-phosphono)-γ-butyrolactone

A mixture of 2-bromo-γ-butyrolactone (16.0 mL) and triethyl phosphite (42.0 mL) was heated up to a reflux and the formed during reaction bromoethane was distilled off. After 4 h the temperature of the reaction mixture reached 140° C. and the formation of bromoethane ceased indicating the end of the reaction. The obtained mixture was cooled to room temperature and then distilled in vacuum to give 27.0 g (61%) of the title compound.

2-Isopropylidene-γ-butyrolactone

A suspension of sodium hydride (2.70 g) in toluene (400 mL) was treated dropwise with 2-(O,O-diethyl-phosphono)-γ-butyrolactone (25.0 g) at room temperature. After reaction with formation of hydrogen ceased, the mixture was treated dropwise with acetone (8.30 mL). Then the temperature of the reaction mixture was slowly raised to 80° C. and stirring was continued at this temperature for additional 2.5 h. After that, the mixture was cooled to room temperature and quenched by pouring onto a mixture of ice and water. The formed organic phase was separated and the aqueous phase was extracted with toluene. The combined organic phases were washed with saturated aqueous solution of sodium carbonate, dried over magnesium sulfate, filtered, concentrated on a rotary evaporator and distilled in vacuum to give 10.5 g (74%) of the title compound.

2-Isopropyl-γ-butyrolactone

In a 250 mL autoclave a mixture of 2-isopropylidene-γ-butyrolactone (10.5 g) and Pd-catalyst (10 wt. % Pd on carbon, 0.050 g) in ethanol (10 mL) was treated with hydrogen (6 bar) at 60° C. for 18 h. Upon completion of the hydrogenation, the mixture was filtered and concentrated on a rotary evaporator to give 9.70 g (91%) of the title compound.

2-Isopropyl-2-methoxymethyl-γ-butyrolactone

A solution of diisopropylamine (13.1 mL) in THF was treated dropwise with butyl lithium (58.4 mL of 1.6M solution in hexanes) at −10° C. Then the reaction mixture was cooled to −70° C. and treated dropwise with 2-isopropyl-γ-butyrolactone (9.30 mL) keeping the speed of the addition at such a rate that the temperature of the mixture remained below −60° C. After completion of the addition, the mixture was stirred for 3 h at −70° C., then warmed-up to −40° C. and treated dropwise at this temperature with chloromethyl methyl ether (7.50 mL). After that, the mixture was allowed to slowly warm-up to room temperature and stirred at this temperature for 80 h. The solvents were removed in vacuum and the residue was redissolved in dichloromethane, then washed with a saturated aqueous solution of ammonium chloride, dried over magnesium sulfate, filtered, concentrated on a rotary evaporator and distilled in vacuum to give 7.00 g (57%) of the title compound.

2-Phenyl-2-methoxymethyl-γ-butyrolactone

(2-Bromoethoxy)trimethylsilane

A solution of chlorotrimethylsilane (34.9 g) and triethylamine (40.5 g) in dichloromethane (200 mL) was treated dropwise with 2-bromoethanol (40.0 g) while keeping the temperature of the mixture below 30° C. Upon completion of the addition, the mixture was stirred at room temperature for addition 1 h and then was diluted with pentane (200 mL). The formed precipitate was filtered off and thoroughly washed with pentane. The resulted filtrate and the washings were combined, concentrated on a rotary evaporator and finally distilled in vacuum to give 57.0 g (90%) of the title compound.

2-Phenyl-γ-butyrolactone

A suspension of potassium tert-butoxide (12.3 g) in toluene (200 mL) was treated dropwise with a mixture of phenylacetonitrile (12.9 g) and (2-bromoethoxy)trimethyl-silane (23.8 g) at room temperature. Upon completion of the addition, the reaction mixture was refluxed for 5 h, then cooled to room temperature and quenched by pouring onto a mixture of ice and water. The formed organic phase was separated and the aqueous phase was extracted with benzene. The combined organic phases were washed with water, dried over magnesium sulfate, filtered and concentrated on a rotary evaporator to give 2-phenyl-4-trimethylsilanyloxy-butyronitrile. The obtained butyronitrile derivative was redissolved in a mixture of ethanol (40 mL) and 70% aqueous sulfuric acid (40 mL), stirred at 50° C. for 3 h and, after cooling to room temperature, diluted with water (150 mL). The resulted organic phase was separated and the aqueous phase was extracted with benzene. The combined organic phases were washed with water, then with saturated aqueous solution of sodium bicarbonate, dried over magnesium sulfate, filtered, concentrated on a rotary evaporator and distilled in vacuum to give 11.0 g (62%) of the title compound.

2-Phenyl-2-methoxymethyl-γ-butyrolactone

Butyl lithium (62.5 mL of 1.6M solution in hexanes) was treated dropwise with a solution of diisopropylamine (14.0 mL) in THF (200 mL) at −20° C. and the resulted mixture was stirred for additional 30 min at the same temperature. After that the mixture was cooled to −90° C., treated dropwise with a solution of 2-phenyl-γ-butyrolactone (11.0 g) in THF (50 mL) and then stirred for 45 min at the same temperature. Next the reaction mixture was treated dropwise with a solution of chloromethyl methyl ether (8.05 g) in THF (50 mL), stirred for additional 10 min, then allowed to slowly warm-up to room temperature and stirred at this temperature for 16 h. Subsequently the reaction mixture was quenched by pouring onto a mixture of ice and 10% aqueous phosphoric acid. The formed organic phase was separated and the aqueous phase was extracted with chloroform. The combined organic phases were washed with saturated aqueous solution of potassium bicarbonate, then water, dried over magnesium sulfate, filtered, concentrated on a rotary evaporator and distilled in vacuum to give 11.5 g (82%) of the title compound.

Propylene Polymerization: General Procedure

A 4-liter autoclave was purged with a nitrogen flow at 70° C. for one hour and then charged at 30° C. under a propylene flow with 75 mL of anhydrous hexane containing 800 mg of $AlEt_3$, 79.8 mg of dicyclopentyldimethoxysilane and 10.0 mg of a solid catalyst component. The autoclave was closed. After that, 1.5 NL of hydrogen were added to the autoclave and then, under stirring, 1.2 Kg of liquid propylene were fed. The temperature was raised to 70° C. in five minutes and the polymerization was carried out at this temperature for two hours. The unreacted propylene was removed. The obtained polymer was recovered, dried at 70° C. under vacuum for three hours, weighted and then fractionated with o-xylene at 25° C. to determine the amount of the xylene insoluble fraction (X.I.).

Determination of X.I.

2.50 g of polymer were dissolved in 250 mL of o-xylene under stirring at 135° C. for 30 minutes. Then the solution was cooled to 25° C. and after 30 minutes the insoluble polymer fraction was filtered off. The resulting solution was evaporated in a nitrogen flow and the residue was dried and weighted to determine the percentage of soluble polymer and then, by difference, the xylene insoluble fraction (%).

EXAMPLES

Examples 1-5 and Comparative Examples 6-7

Preparation of Solid Catalyst Components

Into a 500 mL four-neck round bottom flask, purged with nitrogen, 250 mL of $TiCl_4$ were introduced at 0° C. While stirring, 10 g of microspheroidal $MgCl_2.2.8C_2H_5OH$ (prepared according to the method described in ex. 2 of U.S. Pat. No. 4,399,054 but operating at 3.000 rpm instead of 10.000) and 7.4 mMoles of γ-butyrolactone derivative were added. The temperature was raised to 100° C. and maintained for 120 min. Then the stirring was discontinued, the solid product was allowed to settle and the supernatant liquid was siphoned off.

250 mL of fresh $TiCl_4$ were added. The mixture was reacted at 120° C. for 60 min and then the supernatant liquid was siphoned off. The solid was washed six times with anhydrous hexane (6×100 mL) at 60° C. Finally, the solid was dried under vacuum and analyzed. The type and amount of γ-butyrolactone derivative (wt %) and the amount of Ti (wt %) contained in the solid catalyst component are reported in Table 1. Polymerization results are reported in Table 2.

TABLE 1

| | γ-Butyrolactone derivative | | Ti |
|---|---|---|---|
| Ex. | Type | Wt. % | Wt. % |
| 1 | α-hexyl-α-methoxymethyl-γ-butyrolactone | 13.6 | 3.3 |
| 2 | α-cyclohexylmethyl-α-methoxymethyl-γ-butyrolactone | 14 | 4.0 |
| 3 | α-cyclohexylmethyl-α-ethoxymethyl-γ-butyrolactone | 7.9 | 4.0 |
| 4 | α-isopropyl-α-methoxymethyl-γ-butyrolactone | 11.2 | 4.0 |
| 5 | α-phenyl-α-methoxymethyl-γ-butyrolactone | 9.0 | 2.8 |
| Comp. 6 | α-phenyl-α-methoxy-γ-butyrolactone | — | 2.5 |
| Comp. 7 | α-cyclohexylmethyl-α-propyl-γ-butyrolactone | 4.1 | 4.2 |

TABLE 2

| Example | Yield KgPP/gCat | X.I. Wt. % |
|---|---|---|
| 1 | 22.8 | 95.8 |
| 2 | 34.6 | 96.0 |
| 3 | 38.7 | 95.1 |
| 4 | 22.5 | 95.1 |
| 5 | 18.3 | 96.5 |
| Comp. 6 | 14.5 | 90.7 |
| Comp. 7 | 41.2 | 91.7 |

The invention claimed is:

1. A solid catalyst component for polymerizing at least one olefin comprising Mg, Ti, at least one halogen, and at least one electron donor selected from a γ-butyrolactone derivative of formula (I)

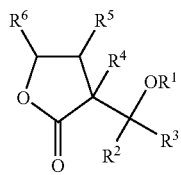

(I)

wherein $R^2$-$R^6$ are, same or different, hydrogen, or a $C_1$-$C_{20}$ hydrocarbon group optionally comprising at least one heteroatom, or two or more of $R^2$-$R^6$ can be linked to form a cycle; and $R^1$ is a $C_1$-$C_{20}$ hydrocarbon group optionally comprising at least one heteroatom.

2. The catalyst component according to claim 1, wherein $R^5$-$R^6$ are hydrogen, or $C_3$-$C_{10}$ hydrocarbon groups.

3. The catalyst component according to claim 1, wherein $R^4$ is a $C_3$-$C_{10}$ hydrocarbon group.

4. The catalyst component according to claim 3, wherein $R^4$ is a primary or secondary alkyl group.

5. The catalyst component according to claim 1, wherein $R^2$-$R^3$ are hydrogen.

6. The catalyst component according to claim 1, wherein $R^1$ is a primary $C_1$-$C_{10}$ alkyl group.

7. The catalyst component of claim 1 comprising a titanium compound comprising at least one Ti-halogen bond.

8. The catalyst component of claim 1, wherein the γ-butyrolactone derivative is supported on a Mg halide in active form.

9. A catalyst for polymerizing at least one olefin comprising a product of a reaction between:
  a solid catalyst component comprising Mg, Ti, at least one halogen, and at least one electron donor selected from a γ-butyrolactone derivative of formula (I)

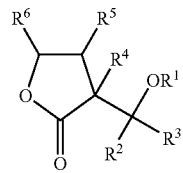

(I)

wherein $R^2$-$R^6$ are, same or different, hydrogen, or a $C_1$-$C_{20}$ hydrocarbon group optionally comprising at least one heteroatom, or two or more of $R^2$-$R^6$ can be linked to form a cycle; and $R^1$ is a $C_1$-$C_{20}$ hydrocarbon group optionally comprising at least one heteroatom;
  an alkylaluminum compound; and
  optionally, one or more electron-donor compounds (external donor).

10. The catalyst according to claim 9, wherein the alkylaluminum compound is a trialkylaluminum compound.

11. A process for polymerizing at least one olefin comprising carrying out the process in presence of a catalyst comprising a product of a reaction between:
  a solid catalyst component comprising Mg, Ti, at least one halogen, and at least one electron donor selected from a γ-butyrolactone derivative of formula (I)

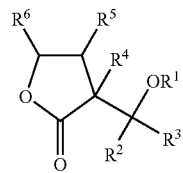

(I)

wherein $R^2$-$R^6$ are, same or different, hydrogen, or a $C_1$-$C_{20}$ hydrocarbon group optionally comprising at least one heteroatom, or two or more of $R^2$-$R^6$ can be linked to form a cycle; and $R^1$ is a $C_1$-$C_{20}$ hydrocarbon group optionally comprising at least one heteroatom;
  an alkylaluminum compound; and
  optionally, one or more electron-donor compounds (external donor).

* * * * *